(No Model.)

W. BURNLEY.
GALVANIC BATTERY.

No. 498,422. Patented May 30, 1893.

WITNESSES:
J. Keese Hallock
Wm. Marles Jr.

INVENTOR:
Wm. Burnley
by Hallock & Hallock
his Attys.

UNITED STATES PATENT OFFICE.

WILLIAM BURNLEY, OF NORTH EAST, PENNSYLVANIA.

GALVANIC BATTERY.

SPECIFICATION forming part of Letters Patent No. 498,422, dated May 30, 1893.

Application filed June 15, 1892. Serial No. 436,771. (No model.)

*To all whom it may concern:*

Be it known that I, WILLIAM BURNLEY, a citizen of the United States, residing at North East, in the county of Erie and State of Pennsylvania, have invented certain new and useful Improvements in Galvanic Batteries; and I do hereby declare the following to be a full, clear, and exact description of the invention, such as will enable others skilled in the art to which it appertains to make and use the same.

My invention relates to that type of galvanic batteries that is known as dry batteries and consists in certain improvements in the construction of the same, as will be hereinafter fully set forth and pointed out in the claim.

Figure 1:
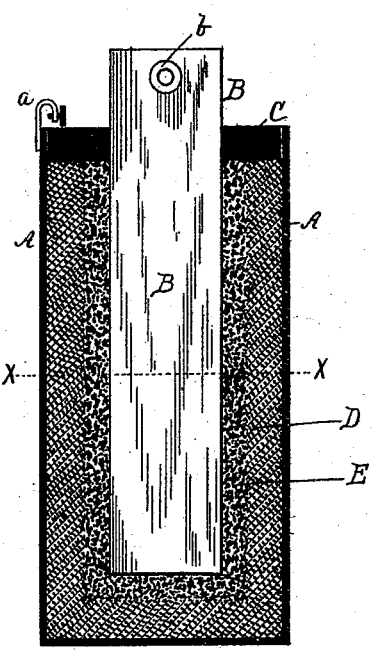
Figure 2:
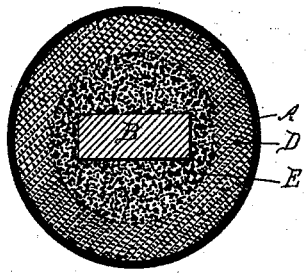

My invention is illustrated in the accompanying drawings as follows:

Figure 1 is a longitudinal section showing the core of the inner electrode in elevation. Fig. 2 is a transverse section taken on the line $x\,x$ in Fig. 1.

A, marks the position or zinc electrode which I prefer to make in the form of a cylindrical cell or cup.

$a$ is the binding post on the electrode A.

B, is the carbon or negative electrode core or stem which is in the form of a bar of solid carbon.

$b$ is the binding post on the electrode B.

C, is the cover or seal of the cell.

D, is a layer or lining, plastic or semi-solid material, containing an exciting agent, which lines the zinc cup or electrode A.

E, is a mass of granulated carbon which surrounds the carbon core or stem, B, and serves to add greatly to the superficial area of carbon surface.

The cup A, carbon core B, seal C, and lining D, I prefer to make substantially the same in every particular as the same parts are described in Letters Patent No. 419,633, issued to me January 21, 1890. But as the construction there described is not essential to my present invention, I do not intend to be limited to the precise forms, materials, or methods of compounding and arranging matter therein specified.

The object of my present invention is to construct a galvanic battery of the class commonly known as "dry," that is small and compact, without the use of a depolarizing agent, that will have sufficient electro-motive power and sufficient duration to serve where periodical action of short duration is only required. Such a battery as I here show and describe will not possess as great electro-motive force as, for example, the one shown in my said patent, nor will it have as great endurance, but it will have sufficient electromotive force and endurance to serve for such uses as telephones, annunciators, bell calls, medical treatment, &c.; and it will possess certain very desirable features for such uses that are not possessed by batteries containing a depolarizing agent. For example, a battery such as I here describe will become polarized if left in action beyond its limit of endurance, and will, hence, become inactive automatically, but through this very characteristic it is self preserving; while a battery that will depolarize will continue to run if short-circuited by accident, or if left in circuit by inattention and will destroy itself. Batteries of this type, if made as commonly, and without a depolarizing agent, will become polarized so quickly as to become unserviceable for any practical purpose.

By my construction here shown I provide for prolonging the action of the battery sufficiently to make it serviceable for certain practical purposes as above stated, and I thereby obtain a battery that will not become wasted by accident or inattention. The process of depolarization in my present battery takes place through dissipation by natural causes during the intervals between action, and hence it is only adapted to such uses as permit of periodical action with intervening periods of rest, and in which a high degree of electro-motive force is not required; examples of which uses are stated above.

The gist of my invention is as follows: It is a well known fact that polarization is caused by the negative electrode becoming coated with hydrogen evolved by the action of the battery; hence by enlarging the surface of the negative electrode the duration of the battery is increased. In batteries of the type herein shown it is not practical to employ a solid negative electrode of sufficient surface area to effect a sufficient prolongation for practical results. I secure this desired result by surrounding the solid core of carbon B, with a mass of granulated carbon, or other equally effective matter, which is put in place without being compacted, but so as to leave the surface of each particle of the granulated matter exposed to the action of the hydrogen. The effect of this construction is that the negative electrode consists of a small solid core and a surrounding mass of open matter, and the total superficial area of exposed surface of the negative agent is excessively large, while the cubical area is within convenient limits. The total superficial surface area of the negative electrode as thus constructed, is, as a matter of fact, the surface area of the core plus the surface area of all the particles of carbon in the mass, E. The granulated matter E, may be saturated with sal-ammoniac or other exciting agent before it is put in place or after it is put in place, or it may be left to become saturated with the exciting agent by absorption from the lining D, as would be the case.

In my said Patent No. 419,633 the space around the carbon electrode corresponding to the space here occupied by the matter E, is occupied by a compound containing granulated carbon and a depolarizing agent. Such a construction does not comprehend my present invention, and the action of the two structures is entirely different.

What I claim as new is—

In a dry galvanic battery, the combination with the positive element consisting of the zinc cup, A, lined with a plastic or semi-solid material, D, containing an exciting agent, of a negative element consisting of the carbon core, B, and granulated carbon, E, packed into the space between the core, B, and the lining, D, as and for the purposes mentioned.

In testimony whereof I affix my signature in the presence of two witnesses.

WILLIAM BURNLEY.

Witnesses:
JNO. K. HALLOCK,
WM. P. HAYES.